(No Model.)
J. C. BARBER.
SOLDERING IRON.
No. 593,918. Patented Nov. 16, 1897.
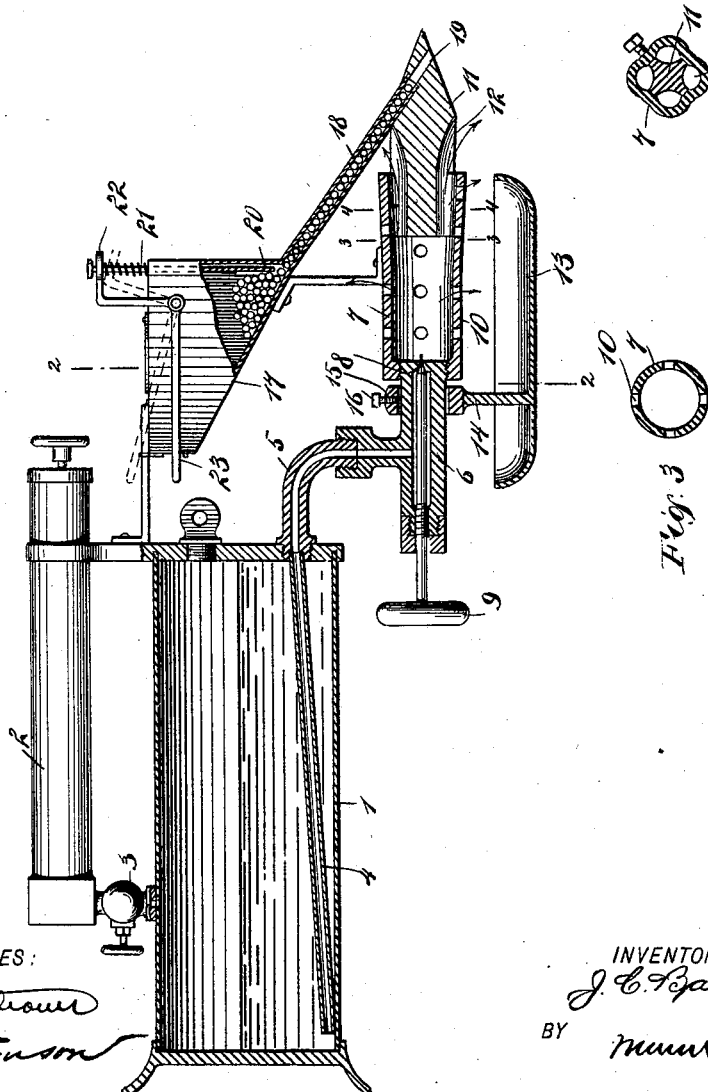
WITNESSES:
INVENTOR
J. C. Barber.
BY
ATTORNEYS.

UNITED STATES PATENT OFFICE.

JOHN C. BARBER, OF PHILLIPSBURG, NEW JERSEY.

SOLDERING-IRON.

SPECIFICATION forming part of Letters Patent No. 593,918, dated November 16, 1897.

Application filed May 15, 1897. Serial No. 636,689. (No model.)

*To all whom it may concern:*

Be it known that I, JOHN C. BARBER, of Phillipsburg, in the county of Warren and State of New Jersey, have invented a new and Improved Soldering-Iron, of which the following is a full, clear, and exact description.

This invention relates to soldering-irons; and the object is to provide a soldering-iron with a simple means for heating it and keeping it heated while in use, thus resulting in a considerable saving of time as compared with irons that require heating in a furnace.

I will describe a soldering-iron embodying my invention, and then point out the novel features in the appended claims.

Reference is to be had to the accompanying drawings, forming a part of this specification, in which similar characters of reference indicate corresponding parts in all the views.

Figure 1 is a longitudinal section of a soldering-iron embodying my invention. Fig. 2 is a section on the line 2 2 of Fig. 1. Fig. 3 is a section on the line 3 3 of Fig. 1, and Fig. 4 is a section on the line 4 4 of Fig. 1.

The invention comprises a tank 1 for containing gasolene or other liquid from which a gas may be generated by mixture with air. Mounted on this tank 1 is a pump 2, having a valve-controlled communication 3 with the interior of the tank. This pump 2 will also serve as a handle for the instrument. Extended along the lower part of the tank 1 is a pipe 4. This pipe 4 is shown as inclined downward toward one end of the tank, so that its open inner end will lie upon the bottom of the tank in order that it may receive all of the liquid when the said liquid becomes low in the tank.

The pipe 4 has an outward extension 5, leading into a mixing-chamber 6, which communicates with a burner 7. The communication between the parts 6 and 7 is controlled by a needle-point valve 8, having a stem extended through the end of the mixing-chamber or cylinder 6, and this stem at its outer end is provided with a hand-wheel 9.

The burner 7 consists of a tube having a series of perforations 10 through its wall for the admission of air, and in the forward end of this burner 7 is a soldering-iron 11, which has a series of longitudinal channels 12 to allow the escape of the burning gas.

Arranged below the burner 7 is what may be termed a "preliminary" heating-pan 13. Extended upward from this pan is a post 14, having a yoke 15 at its upper end open at one side and designed to engage over the cylinder 6, and it may be held in place by means of a set-screw 16. Connected to the device is a receptacle 17 for solder, preferably formed in pellets similar to shot. The bottom of this receptacle 17 is inclined forward and downward, and leading from the lower end of the receptacle is an inclined raceway 18, leading into a diagonally-disposed opening 19 through the soldering-iron 11. The communication between the receptacle 17 and the raceway 18 may be controlled by a gate-valve 20, movable vertically within the receptacle 17 and held normally in an open position by means of a spring 21, engaging around the shank of the gate-valve and bearing at one end upon the top of the receptacle and at the other end against a plate 22 on a lever 23, fulcrumed to the receptacle 17. This lever 23 will extend sufficiently far rearward to be in reach of a person's finger, so that by moving said lever upward, as indicated by dotted lines in Fig. 1, the gate-valve will close the outlet and prevent the discharge of the solder pellets.

In operation a sufficient amount of gasolene or similar liquid from which the gas is to be generated will be placed in the container 1, and then air will be pumped into the same by means of the pump 2. After a sufficient amount of air-pressure shall have been obtained of course the globe-valve 3 will be closed. The pan 13 must now be filled or partly filled with gasolene and the same ignited, so as to heat up the burner 7. After this burner is thoroughly heated the needle-valve will be opened to allow the gasolene to escape into the burner and mingle with air to form a gas. This gas will escape through the grooves 12 and will thoroughly heat the iron while burning. Of course the solder pellets will automatically feed through the opening 19 to the under side of the iron, where they will be spread over the seam to be soldered in the usual manner.

By removing the receptacle 17 and the iron 11 it is obvious that the device may be employed for burning paint from wood or other surfaces.

Having thus described my invention, I claim as new and desire to secure by Letters Patent—

1. A soldering-iron, comprising a tank for gasolene or the like, means for forcing air into the same, a burner having communication with the tank, a valve for controlling said communication, a soldering-iron mounted in the burner, a container for solder and a raceway leading from said container to the soldering-iron, substantially as specified.

2. A soldering-iron, comprising a tank for gasolene or the like, a pump for forcing air into the same, a burner having communication with the tank, a valve for controlling said communication, a soldering-iron mounted in the burner, a container for solder, and an inclined raceway leading from said container to an opening through the soldering-iron, substantially as specified.

3. A soldering-iron, comprising a tank for gasolene or the like, a pipe running longitudinally through said tank at its bottom, a pump for forcing air into the tank, a burner communicating with the tank, a valve for controlling said communication, a soldering-iron supported in the forward end of the burner and having a hole diagonally through it, a container for solder pellets, a raceway leading from the said container to the opening through the soldering-iron, a valve for controlling the communication between the raceway and container, a spring for normally holding said valve open, and a fulcrumed lever for closing said valve, substantially as specified.

JOHN C. BARBER.

Witnesses:
HARRY KOCHERSPERGER,
WILLIAM KLINE, Jr.